United States Patent
Aladadyan et al.

(10) Patent No.: US 8,872,084 B1
(45) Date of Patent: Oct. 28, 2014

(54) THREE-DIMENSIONAL SUN VECTOR DETERMINATION UTILIZING LOW-COST SOLAR CELLS

(75) Inventors: Babken Aladadyan, Glendale, CA (US); Robert L. Horton, Torrance, CA (US)

(73) Assignee: The Boeing Company, Chicago, IL (US)

( * ) Notice: Subject to any disclaimer, the term of this patent is extended or adjusted under 35 U.S.C. 154(b) by 273 days.

(21) Appl. No.: 13/114,005

(22) Filed: May 23, 2011

(51) Int. Cl.
*G01C 21/02* (2006.01)

(52) U.S. Cl.
USPC ............................................. 250/203.4

(58) Field of Classification Search
CPC ......... G01J 3/783; G01J 3/784; G01J 3/7862; G05D 3/00; G05D 3/105; F24J 2/38
USPC ....................................................... 250/203.4
See application file for complete search history.

(56) References Cited

U.S. PATENT DOCUMENTS

| | | | | |
|---|---|---|---|---|
| 3,566,131 | A | * | 2/1971 | Kelly ......................... 250/214 R |
| 5,393,970 | A | * | 2/1995 | Shau et al. .................. 250/206.2 |
| 2008/0135734 | A1 | * | 6/2008 | Niemann et al. ........... 250/208.2 |

* cited by examiner

*Primary Examiner* — Thanh Luu
(74) *Attorney, Agent, or Firm* — Vista IP Law Group LLP; Cynthia A. Dixon

(57) ABSTRACT

A system, method, and apparatus for a solar cell based sun sensor are disclosed. The system involves at least three solar panel elements and at least one processor. Each of the solar panel elements measures solar power, and generates currents according to the amount of solar power that the solar power element measures. At least one processor utilizes the currents to determine the three-dimensional sun vector. The solar cell based sun sensor system automatically adjusts for effects of any solar panel element degradation by computing a new maximum current reference value for each solar power measurement. The solar cell based sun sensor system is employed by a spacecraft and/or a terrestrial system. The solar cell based sun sensor system is utilized for guidance, for navigation, for tracking the sun's motion relative to a given reference, to keep instruments pointed to the sun, and/or to keep instruments isolated from the sun.

20 Claims, 4 Drawing Sheets

THREE-DIMENSIONAL SUN VECTOR DETERMINATION UTILIZING LOW-COST SOLAR CELLS

BACKGROUND

The present disclosure relates to sun sensors. In particular, it relates to solar cell based sun sensors.

SUMMARY

The present disclosure relates to a system, method, and apparatus for a solar cell based sun sensor system for determining a three-dimensional sun vector. In particular, the disclosed system involves at least three solar panel elements, and at least one processor. Each of the solar panel elements measures solar power, and generates currents according to the amount of solar power that the solar power element measures. At least one processor utilizes the currents in order to determine the three-dimensional sun vector.

In one or more embodiments, the solar panel elements provide up to a near 180 degree field of view. In at least one embodiment, the solar cell based sun sensor system is employed by a spacecraft, where the spacecraft is a satellite, a pseudo satellite, or a launch vehicle. In some embodiments, the solar cell based sun sensor system is employed by a terrestrial system.

In at least one embodiment, the solar cell based sun sensor system is utilized for guidance, for navigation, for tracking the sun's motion relative to a given reference, to keep instruments pointed to the sun, and/or to keep instruments isolated from the sun. In one or more embodiments, the solar cell based sun sensor system automatically adjusts for effects of any solar panel element degradation by computing a new maximum current reference value for each solar power measurement. In one or more embodiments, the solar panel elements are connected in parallel to one another. In at least one embodiment, the solar cell based sun sensor system further comprises a regulator. The regulator keeps the voltages the same for all of the solar panel elements.

In one or more embodiments, a method for determining a three-dimensional sun vector involves providing at least three solar panel elements. The method further involves measuring, with the solar panel elements, solar power. Further, the method involves generating, with each of the solar panel elements, currents according to the amount of solar power that the solar power element measures. Also, the method involves providing at least one processor. In addition, the method involves utilizing, with the at least one processor, the currents in order to determine the three-dimensional sun vector.

In at least one embodiment, a solar cell based sun sensor apparatus for determining a three-dimensional sun vector involves at least three solar panel elements, and at least one processor. Each of the solar panel elements of the apparatus measures solar power, and generates currents according to the amount of solar power that the solar power element measures. Also, at least one processor utilizes the currents in order to determine the three-dimensional sun vector.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for sun sensors. Specifically, this system relates to solar cell based sun sensors. In particular, the present disclosure teaches a simple, easy to manufacture, analog solar cell based sun sensor that employs inexpensive components. The disclosed solar cell based sun sensor has a wide (near 180 degree) field of view (FOV). In addition, the disclosed solar cell based sun sensor uses straightforward data processing to compute a three-dimensional sun vector.

Specifically, the solar cell based sun sensor uses measured currents from its solar panel elements to determine a three-dimensional sun reference vector in the solar cell based sun sensor's reference frame. Although the disclosed solar cell based sun sensor is inexpensive to manufacture, it is still able to meet or exceed the functionality of conventional wide field-of-view sun sensors. As such, the disclosed solar cell based sun sensor can be utilized as a wide field-of-view sun sensor to provide position/orientation information for on-board guidance, navigation, and control applications. Because of its wide field of view, which is near 180 degrees, one solar cell based sun sensor unit is able provide sky or space coverage equivalent to that of several more-expensive conventional, narrow field-of-view sun sensor units.

The disclosed solar cell based sun sensor may be used in navigation or guidance applications where a three-dimensional vector reference to the sun can be used to provide key orientation information. It may also be used to track the sun's motion relative to a given reference, or to keep instruments sun-pointed. The sensor may similarly be used to control instruments in order to keep them isolated from the sun. This particular application can be useful for sun sensitive instruments or instruments whose measurements degrade based on sun exposure.

In addition, measurements provided by the solar cell based sun sensor automatically adjust for the effects of solar panel element degradation (or other aging effects) by computing a new maximum current reference value for each solar power measurement. Similarly, the measured components of the sun vector are not affected by variations in bus voltage levels because a common reference voltage is supplied to all of the solar panel elements. In one or more embodiments, all of the solar panel elements are identical (or calibrated for differences), and connected in parallel to one another. Additionally, the voltage is kept constant across the solar panel elements by a regulator.

In the following description, numerous details are set forth in order to provide a more thorough description of the system.

It will be apparent, however, to one skilled in the art, that the disclosed system may be practiced without these specific details. In the other instances, well known features have not been described in detail so as not to unnecessarily obscure the system.

Figure 1:
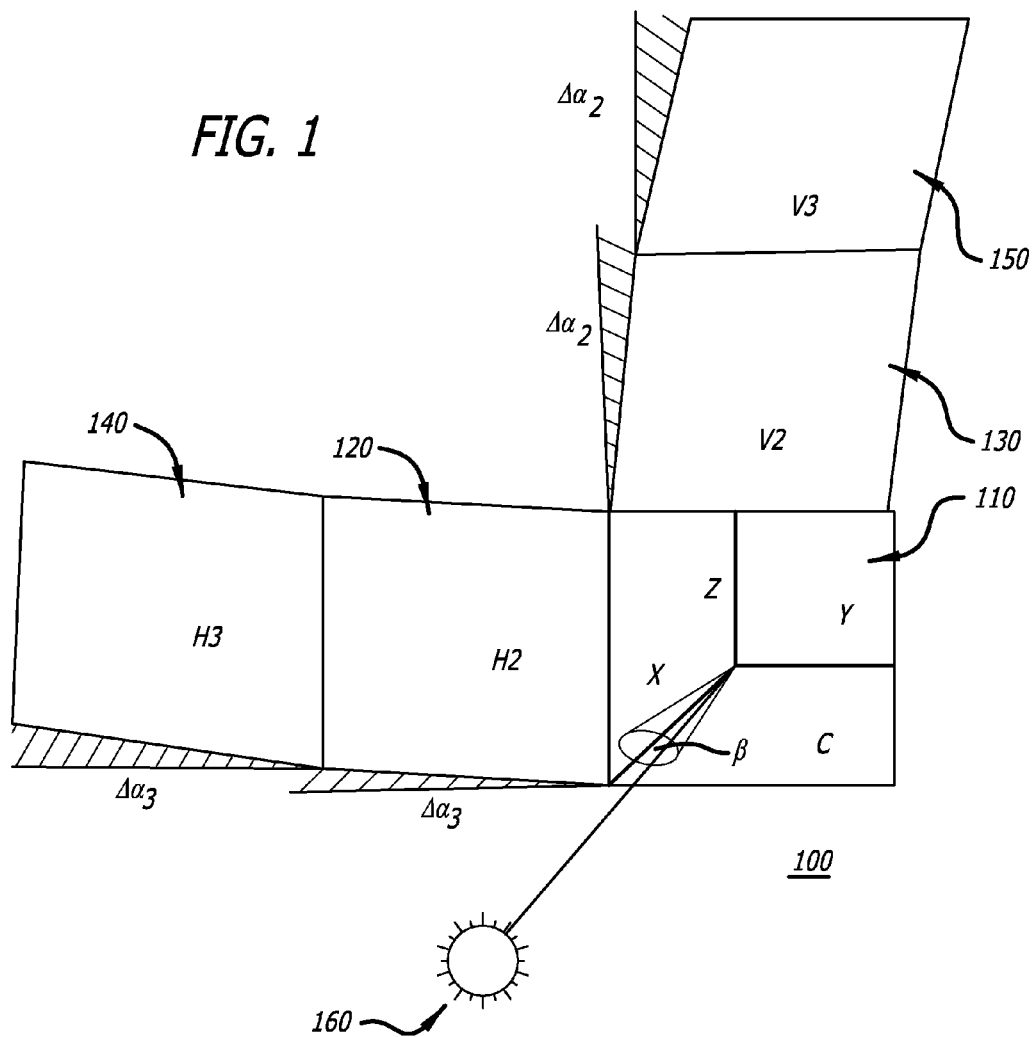
FIG. 1 shows a diagram of a solar cell based sun sensor having five solar panel elements, in accordance with at least one embodiment of the present disclosure.

FIG. 1 shows a diagram of a solar cell based sun sensor 100 having five solar panel elements, in accordance with at least one embodiment of the present disclosure. In this figure, five solar panel elements (C, H2, V2, H3, V3) 110, 120, 130, 140, 150 are depicted. Specifically, these solar panel elements are: central panel C 110, horizontal panel H2 120, vertical panel V2 130, horizontal panel H3 140, and vertical panel V3 150. Each of these solar panel elements (C, H2, V2, H3, V3) 110, 120, 130, 140, 150 measure the amount of solar power that they receive from the sun 160, and generate currents ($I_C$, $I_{H2}$, $I_{V2}$, $I_{H3}$, $I_{V3}$) that are proportional to the amount of solar power that they receive. As such, $I_C$ is the measured current from the central panel C 110; $I_{H2}$ is the measured current from horizontal panel H2 120; $I_{v2}$ is the measured current from vertical panel V2 130; $I_{H3}$ is the measured current from horizontal panel H3 140; and $I_{V3}$ is the measured current from vertical panel V3 150. A processor (not shown) then uses these currents ($I_C$, $I_{H2}$, $I_{V2}$, $I_{H3}$, $I_{V3}$) to determine the coordinates of a three-dimensional sun vector ($S_x$, $S_y$, $S_z$).

In particular, the processor first calculates $I_0$. $I_0$ is the maximum current value, which would be seen when the sun 160 is normal to the center panel C 110. (In this case, the sun vector is measured as (1,0,0), without computing cos β or sin β where β is the angle of rotation around the X axis.)

$$I_0 = \mathrm{sqrt}\{I_{V0}^2 + I_{H0}^2 - I_C^2\}, \text{ where}$$

$$I_{V0}^2 = \frac{I_C^2((I_{V3}-I_C)/2)^2 - I_{V2}^2(I_{V2}-I_C(I_C+I_{V3})/2I_{V2})^2}{((I_{V3}-I_C)/2)^2 - (I_{V2}-I_C(I_C+I_{V3})/2I_{V2})^2},$$

and where $$I_{H0}^2 = \frac{I_C^2((I_{H3}-I_C)/2)^2 - I_{H2}^2(I_{H2}-I_C(I_C+I_{H3})/2I_{H2})^2}{((I_{H3}-I_C)/2)^2 - (I_{H2}-I_C(I_C+I_{H3})/2I_{H2})^2},$$

and where $I_C$ is the measured current from the central panel C 110. Then, the processor calculates cos(Δα₂) and cos(Δα₃).

$$\cos(\Delta\alpha_2) = \frac{(I_C^2 - I_{V3}^2)}{2(I_C I_{V2} - I_{V2} I_{V3})} = \frac{I_C + I_{V3}}{2I_{V2}}$$

$$\cos(\Delta\alpha_3) = \frac{(I_C^2 - I_{H3}^2)}{2(I_C I_{H2} - I_{H2} I_{H3})} = \frac{I_C + I_{H3}}{2I_{H2}}$$

The processor then calculates cos β and sin β.

$$\cos\beta = \frac{\frac{I_{H2}}{I_0} - \frac{I_C}{I_0}\cos\Delta\alpha_3}{\sqrt{(1-(I_C/I_0)^2)\sin\Delta\alpha_3}} = \frac{I_{H2} - I_C\cos\Delta\alpha_3}{\sqrt{I_0^2 - I_C^2}\sin\Delta\alpha_3}$$

$$\sin\beta = \frac{\frac{I_C}{I_0}\cos\Delta\alpha_2 - \frac{I_{V2}}{I_0}}{\sqrt{(1-(I_C/I_0)^2)\sin\Delta\alpha_2}} = \frac{I_C\cos\Delta\alpha_2 - I_{V2}}{\sqrt{I_0^2 - I_C^2}\sin\Delta\alpha_2}$$

Then, the processor calculates cos α and sin α.

$$\cos\alpha = \frac{I_C}{I_0}$$

$$\sin\alpha = \mathrm{sqrt}(1 - I_C^2/I_0^2)$$

The processor then uses cos α, sin α, cos β, and sin β to calculate the coordinates of the three-dimensional sun vector ($S_x$, $S_y$, $S_z$).

$$S_X = \cos\alpha;\ S_Y = \sin\alpha\cos\beta;\ S_Z = \sin\alpha\sin\beta$$

It should be noted that for the three-dimensional sun vector calculations, it is possible to utilize either panel H2 or H3 in the horizontal sensor plane, and either panel V2 or V3 in the vertical sensor plane. The equations are then simply modified, as needed, for the appropriate angle offsets from the central panel. This feature provides some redundancy in the solar cell based sun sensor. In addition, it should be noted that for other embodiments of the present disclosure, the five solar panel elements (C, H2, V2, H3, V3) 110, 120, 130, 140, 150 may be situated in different configurations than the L-type configuration that is depicted in FIG. 1.

Figure 1A:
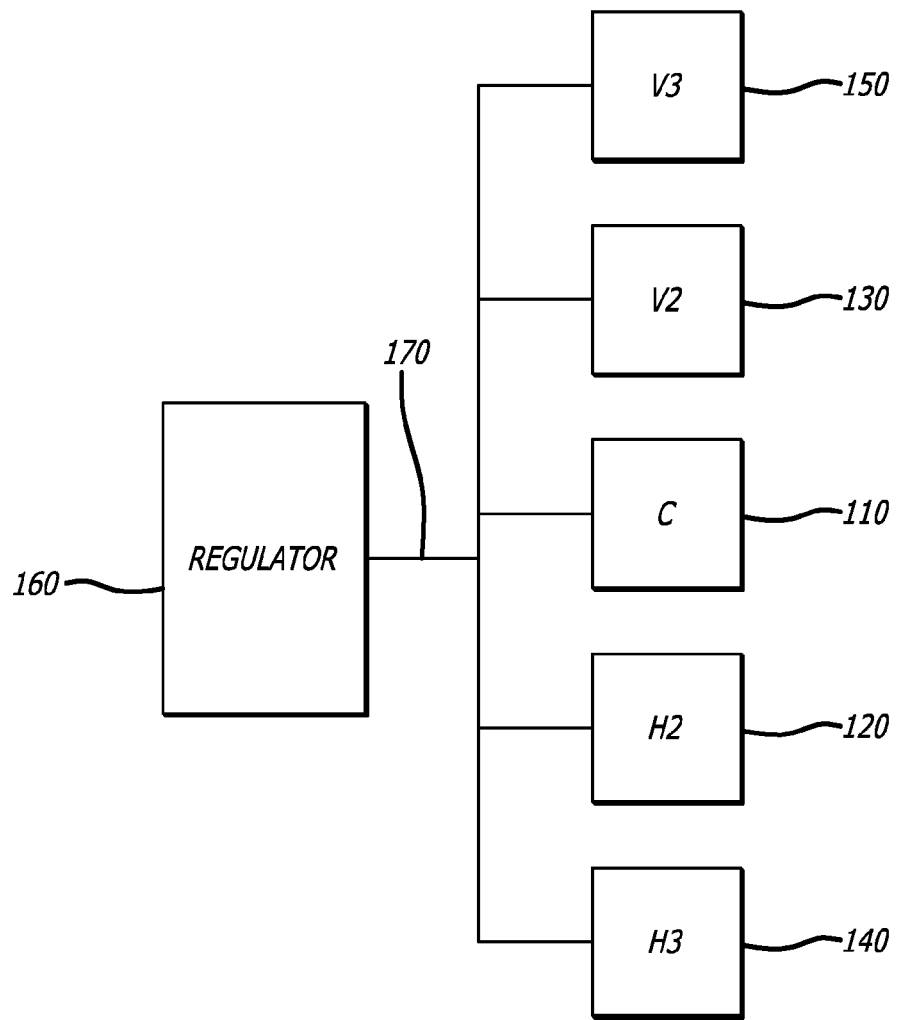
FIG. 1A shows a diagram of a regulator regulating a common reference voltage to the five solar panel elements of the solar cell based sun sensor of FIG. 1, in accordance with at least one embodiment of the present disclosure.

FIG. 1A shows a diagram of a regulator 160 regulating a common reference voltage 170 to the five solar panel elements (C, H2, V2, H3, V3) 110, 120, 130, 140, 150 of the solar cell based sun sensor 100 of FIG. 1, in accordance with at least one embodiment of the present disclosure.

Figure 2:
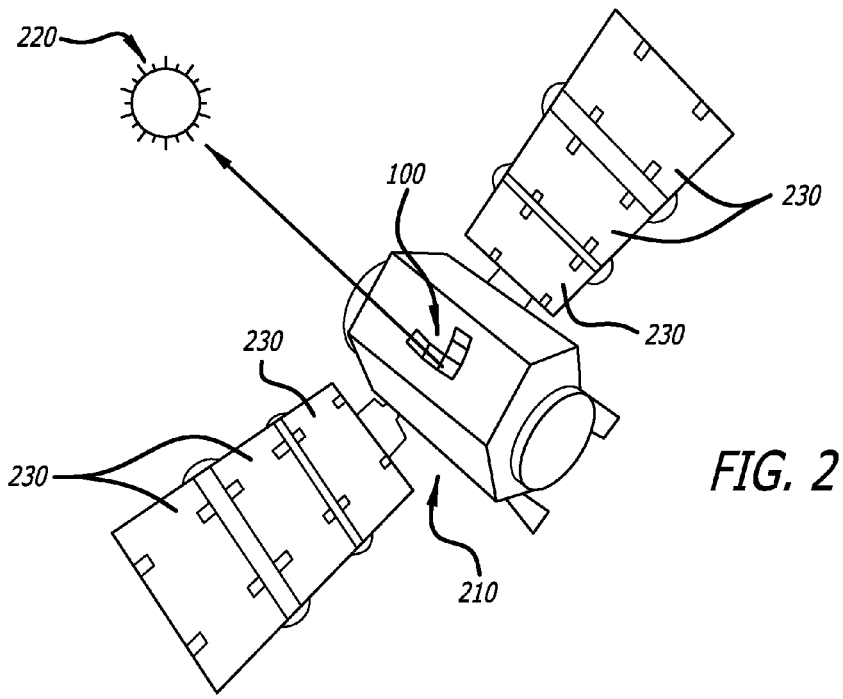
FIG. 2 shows an illustration of a satellite employing the solar cell based sun sensor of FIG. 1, in accordance with at least one embodiment of the present disclosure.

FIG. 2 shows an illustration of a satellite 210 employing the solar cell based sun sensor 100 of FIG. 1, in accordance with at least one embodiment of the present disclosure. Specifically, in this figure, the satellite 210 is using the solar cell based sun sensor 100 to obtain a three-dimensional sun vector. Also in this figure, the solar cell based sun sensor 100 is shown to be measuring solar power from the sun 220. The satellite 210 is using the solar cell based sun sensor 100 for guidance, for navigation, for tracking the sun's motion relative to a given reference, to keep instruments (including solar panels 230) pointed to the sun, and/or to keep instruments isolated from the sun.

Figure 3:
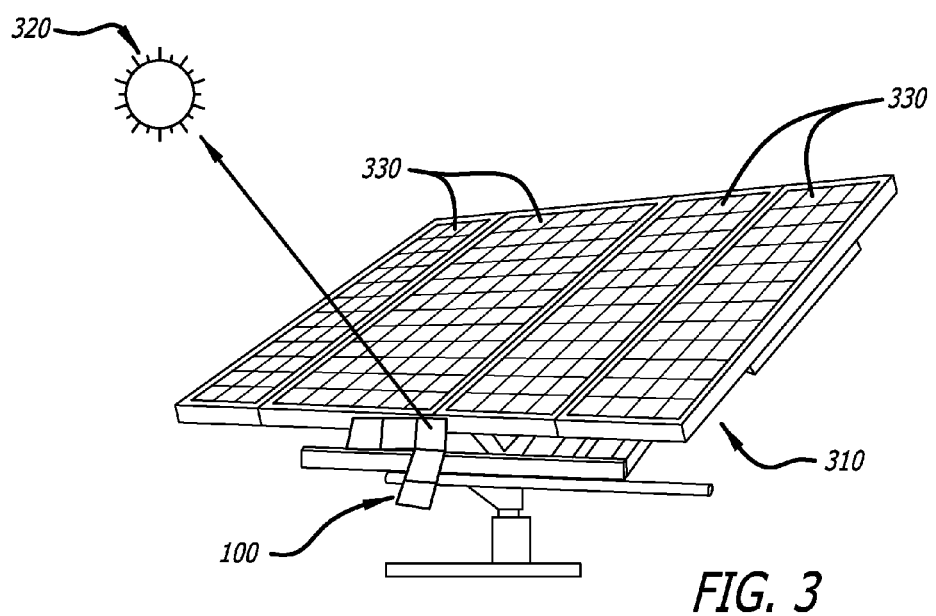
FIG. 3 shows an illustration of a terrestrial solar panel system employing the solar cell based sun sensor of FIG. 1, in accordance with at least one embodiment of the present disclosure.

FIG. 3 shows an illustration of a terrestrial solar panel system 310 employing the solar cell based sun sensor 100 of FIG. 1, in accordance with at least one embodiment of the present disclosure. In this figure, the solar cell based sun sensor 100 is shown to be measuring solar power from the sun 320. The terrestrial solar panel system 310 is using the solar cell based sun sensor 100 in order to keep its solar panels 330 pointed towards the sun 320.

Figure 4:
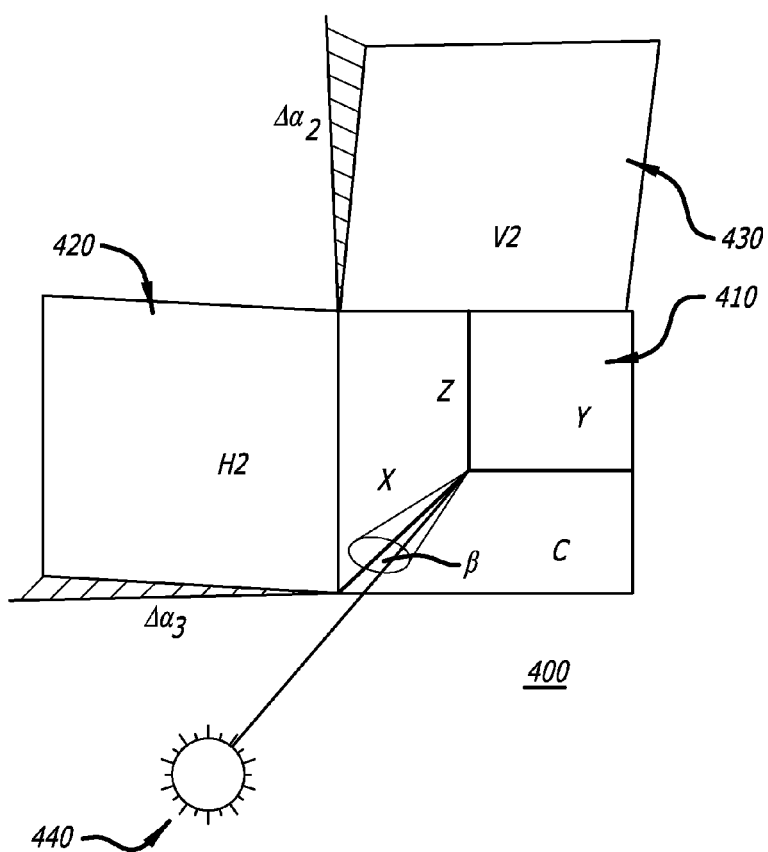
FIG. 4 shows a diagram of a solar cell based sun sensor having three solar panel elements, in accordance with at least one embodiment of the present disclosure.

FIG. 4 shows a diagram of a solar cell based sun sensor 400 having three solar panel elements, in accordance with at least one embodiment of the present disclosure. It is possible to fulfill the algorithmic needs of the solar cell based sun sensor 400 with only three solar panel elements, as opposed to using five solar panel elements, assuming that there are no solar panel element failures. This three solar panel element sensor 400 can be used as a very inexpensive sun sensor to provide initial orientation information when a satellite is initially orienting itself. In addition, this sensor 400 can be used for many other applications. It should be noted that the five solar panel element sensor of FIG. 1 can be used beyond the early orienting stage of the satellite to provide ongoing sun vector information to the satellite.

In FIG. 4, three solar panel elements (C, H2, V2) 410, 420, 430 are illustrated. These three solar panel elements are: central panel C 410, horizontal panel H2 420, and vertical panel V2 430. Each of these solar panel elements (C, H2, V2) 410, 420, 430 measure the amount of solar power that they receive from the sun 440. They generate currents ($I_C$, $I_{H2}$, $I_{V2}$) that are proportional to the amount of solar power that they each receive. Accordingly, $I_C$ is the measured current from the central panel C 410; $I_{H2}$ is the measured current from horizontal panel H2 420; and $I_{V2}$ is the measured current from vertical panel V2 430. A processor (not shown) uses these currents ($I_C$, $I_{H2}$, $I_{V2}$) to determine the coordinates of a three-dimensional sun vector ($S_x$, $S_y$, $S_z$).

The processor first calculates $I_0$. $I_0$ is the maximum current value, which would be seen when the sun 440 is normal to the center panel C 410. (In this case, the sun vector is measured as (1,0,0), without computing cos β or sin β where β is the angle of rotation around the X axis.)

$$I_0 = \operatorname{sqrt}\{I_{V0}^2 + I_{H0}^2 - I_C^2\}; \text{ where}$$

$$I_{V0}^2 = \frac{(I_C \cos(\Delta\alpha_2) - I_{V2})^2 + I_C^2 \sin^2(\Delta\alpha_2)}{\sin^2(\Delta\alpha_2)};$$

and where $$I_{H0}^2 = \frac{(I_C \cos(\Delta\alpha_3) - I_{H2})^2 + I_C^2 \sin^2(\Delta\alpha_3)}{\sin^2(\Delta\alpha_3)};$$

and where $I_C$ is the measured current from the central panel C 410; $I_{H2}$ is the measured current from horizontal panel H2 420; $I_{V2}$ is the measured current from vertical panel V2 430; and $\Delta\alpha_2$ and $\Delta\alpha_3$ are known angles (e.g., angles that were measured during manufacturing or post-installation calibration).

The processor then calculates cos β and sin β.

$$\cos\beta = \frac{\frac{I_{H2}}{I_0} - \frac{I_C}{I_0}\cos\Delta\alpha_3}{\sqrt{(1-(I_C/I_0)^2)}\sin\Delta\alpha_3} = \frac{I_{H2} - I_C\cos\Delta\alpha_3}{\sqrt{I_0^2 - I_C^2}\sin\Delta\alpha_3}$$

$$\sin\beta = \frac{\frac{I_C}{I_0}\cos\Delta\alpha_2 - \frac{I_{V2}}{I_0}}{\sqrt{(1-(I_C/I_0)^2)}\sin\Delta\alpha_2} = \frac{I_C\cos\Delta\alpha_2 - I_{V2}}{\sqrt{I_0^2 - I_C^2}\sin\Delta\alpha_2}$$

Then, the processor calculates cos α and sin α.

$$\cos\alpha = \frac{I_C}{I_0}$$

$$\sin\alpha = \operatorname{sqrt}(1 - I_C^2/I_0^2)$$

The processor uses cos α, sin α, cos β, and sin β to calculate the coordinates of the three-dimensional sun vector ($S_x$, $S_y$, $S_z$).

$$S_x = \cos\alpha;\ S_y = \sin\alpha\cos\beta;\ S_z = \sin\alpha\sin\beta$$

If all of the solar panel elements degrade evenly, the solar cell based sun sensor 400 and associated algorithm automatically compensate for the degradation and, as such, no adjustment is required. For a sun sensor used only during the beginning of a spacecraft's life, the three solar panel element sensor 400 may be sufficient. For the case when one individual solar panel element fails, $I_2$ in the formulas is replaced by $I_3$ and angles ($\Delta\alpha_3$ and $\Delta\alpha_2$) are replaced with ($2\Delta\alpha_3$ and $2\Delta\alpha_2$) to automatically adjust for the failed solar panel element. In addition, it should be noted that for other embodiments of the present disclosure, the three solar panel elements (C, H2, V2) 410, 420, 430 may be situated in different configurations than the L-type configuration that is depicted in FIG. 4.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A solar cell based sun sensor system for determining a three dimensional sun vector, the system comprising:
   at least three solar panel elements,
   wherein the at least three solar panel elements are configured in an L-type configuration,
   wherein one of the at least three solar panel elements is a central panel element,
   wherein each of the at least three solar panel elements is connected in parallel to one another,
   and
   wherein each of the solar panel elements measures solar power, and generates currents according to the amount of solar power that the solar power element measures; and
   at least one processor,
   wherein the at least one processor utilizes the currents in order to determine the three-dimensional sun vector.

2. The solar cell based sun sensor system of claim 1, wherein the solar panel elements provide up to a near 180 degree field of view.

3. The solar cell based sun sensor system of claim 1, wherein the solar cell based sun sensor system is employed by a spacecraft,
   wherein the spacecraft is one of a satellite, a pseudo satellite, and a launch vehicle.

4. The solar cell based sun sensor system of claim 1, wherein the solar cell based sun sensor system is employed by a terrestrial system.

5. The solar cell based sun sensor system of claim 1, wherein the solar cell based sun sensor system is utilized for guidance.

6. The solar cell based sun sensor system of claim 1, wherein the solar cell based sun sensor system is utilized for navigation.

7. The solar cell based sun sensor system of claim 1, wherein the solar cell based sun sensor system is utilized for tracking the sun's motion relative to a given reference.

8. The solar cell based sun sensor system of claim 1, wherein the solar cell based sun sensor system is utilized to keep instruments pointed to the sun.

9. The solar cell based sun sensor system of claim 1, wherein the solar cell based sun sensor system is utilized to keep instruments isolated from the sun.

10. The solar cell based sun sensor system of claim 1, wherein the solar cell based sun sensor system automatically adjusts for effects of any solar panel element degradation by computing a new maximum current reference value for each solar power measurement.

11. The solar cell based sun sensor system of claim 1, wherein a common reference voltage is supplied to the solar panel elements.

12. The solar cell based sun sensor system of claim 1, wherein the solar panel elements are connected in parallel to one another.

13. The solar cell based sun sensor system of claim 1, wherein the solar cell based sun sensor system further comprises a regulator,
wherein the regulator keeps voltages the same for all of the solar panel elements.

14. A method for determining a three-dimensional sun vector, the method comprising:
providing at least three solar panel elements,
wherein the at least three solar panel elements are configured in an L-type configuration,
wherein one of the at least three solar panel elements is a central panel element,
wherein each of the at least three solar panel elements is connected in parallel to one another,
measuring, with the solar panel elements, solar power;
generating, with each of the solar panel elements, currents according to the amount of solar power that the solar power element measures;
providing at least one processor; and
utilizing, with the at least one processor, the currents in order to determine the three-dimensional sun vector.

15. The method of claim 14, wherein the solar panel elements provide up to a near 180 degree field of view.

16. The method of claim 14, wherein the method is employed by a spacecraft,
wherein the spacecraft is one of a satellite, a pseudo satellite, and a launch vehicle.

17. The method of claim 14, wherein the method is employed by a terrestrial system.

18. The method of claim 14, wherein the method is utilized for guidance.

19. The method of claim 14, wherein the method is utilized for navigation.

20. A solar cell based sun sensor apparatus for determining a three-dimensional sun vector, the apparatus comprising:
at least three solar panel elements,
wherein the at least three solar panel elements are configured in an L-type configuration,
wherein one of the at least three solar panel elements is a central panel element,
wherein each of the at least three solar panel elements is connected in parallel to one another, and
wherein each of the solar panel elements measures solar power, and generates currents according to the amount of solar power that the solar power element measures; and
at least one processor,
wherein the at least one processor utilizes the currents in order to determine the three-dimensional sun vector.

\* \* \* \* \*